March 18, 1930.　　　G. M. SMITH　　　1,751,425
BIFOCAL FITTING DEVICE
Original Filed June 25, 1925
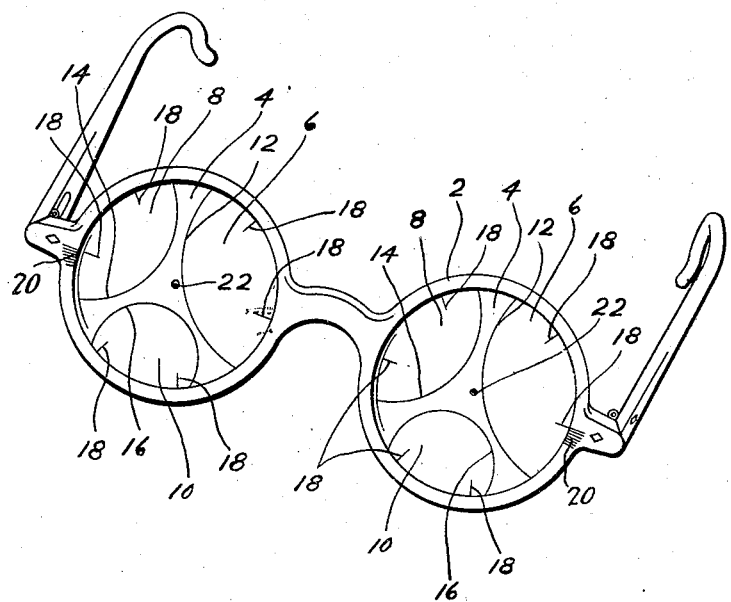
Inventor
George M. Smith, Dec'd.
By George W. Perkins, Admr.
By David Rines
　　Attorney Patented Mar. 18, 1930

1,751,425

UNITED STATES PATENT OFFICE

GEORGE M. SMITH, DECEASED, LATE OF ARLINGTON, MASSACHUSETTS, BY GEORGE WILLIAM PERKINS, ADMINISTRATOR, OF EVERETT, MASSACHUSETTS, ASSIGNOR TO BAUSCH & LOMB OPTICAL COMPANY, OF ROCHESTER, NEW YORK, A CORPORATION OF NEW YORK

BIFOCAL-FITTING DEVICE

Original application filed June 25, 1925, Serial No. 39,509. Divided and this application filed November 11, 1925. Serial No. 68,318.

The present invention relates to devices for fitting patients with ophthalmic mountings, and more particularly for fitting bifocal lenses. The present application is a division of a copending application Serial No. 39,509, filed June 25, 1925.

Unless the bifocal wafer of a bifocal lens is properly positioned relatively to the pupil of the wearer's eye, it causes great annoyance, and the glasses are sometimes worse than no glasses at all. A number of devices have been proposed for properly positioning the bifocal wafer, but they are either too complicated or too clumsy for practical use. Opticians, therefore, still fit the wafers largely by guess work. The consequent discomfort is very great, and in a large percentage of cases, the lenses must be thrown away and replaced by others that fit better.

A chief object of the invention is to enable the optician, by simple means and with a minimum of trouble, to position the bifocal wafer accurately to the wearer's eye convergence and at the proper distance below the pupil's normal position, or the position occupied by the pupil for distance vision. Other and further objects will appear hereinafter, and will be specified in the appended claims. The single figure of the accompanying drawings is a perspective view illustrating the invention in preferred form.

According to the present invention, a lens mounting or frame 2 is mounted upon the wearer's face and the position of the bifocal wafer corresponding to the pupil of the wearer's eye is determined by inspection upon a lens 4 mounted on the mounting 2. The term "lens", as used in the specification and claims, is intended to cover any transparent medium placed before the eye. The lens 4 is provided with three imitation bifocal wafers or reading portions 6, 8 and 10, as illustrated in Fig. 1, the imitation wafers being marked out upon the lens by lines 12, 14 and 16, respectively. It will be understood that the lines 12, 14 and 16 do not, as in ordinary bifocal lenses, separate regions of different magnification of the lens 4, but that they are mere arbitary markings upon a lens having the same magnification both on the bifocal wafers and on the adjacent body portions of the lens. The present invention does not depend for its operability upon any particular degree of magnification of the lens 4, whether high or low or even zero. The lines 12, 14 and 16 may be etched upon the lens, or may be marked thereon in any other desired manner. The bifocal wafers 6, 8 and 10 are spaced along the circumference of the lens 4. The bifocal wafers, 6, 8 and 10 correspond in size and shape to three types of wafers upon the market. This, however, is not essential. It is desirable to have these lines at different distances from the center 22 of the lens.

A plurality of indices 18, spaced along the circumference of the lens 4, are adapted to cooperate with one or more indices or graduations 20 provided at any suitable position upon the mounting 2, as at the end pieces. The indices 18 may be brought into cooperative relation with the graduations 20 by rotating the lens 4 in the mounting 2.

In operation, after the mounting 2 has been placed upon the wearer's face, the lens 4 is first rotated in the mounting 2 until the desired wafer 6, 8 or 10 is swung opposite to the pupil of the wearer's eye when converged. The lens is then further rotated slightly in one direction or the other until the pupil convergence is accurately matched. The desired angular position may be read by means of one of the indices 18 and the graduations 20. This, however, is not enough. It is further necessary to indicate the distance of the top of the wafer 6, 8 or 10, as the case may be, below the center 22 of the lens. The pupil will be positioned opposite the center 22 for distance vision. This may be done by again rotating the lens until it is determined which of the three lines 12, 14 and 16 is properly positioned below the pupil when the latter is centered for distance vision. The usual distance of the top of the wafer below the normal position of the eye, or below the center 22, is between two and three millimeters, but this may be varied, as may be necessary. Both the eye convergence and the position of the wafer below the pupil are thus determined at a mere glance.

According to the present invention, therefore, very simple means is provided for enabling the optician to determine accurately, at a glance, where the bifocal wafer of a bifocal lens should be placed before the wearer's eye, and also what type or style of wafer is most suitable for the particular wearer.

It will be understood that the invention is not limited to the exact embodiments thereof that are herein illustrated and described, but modifications may be made by persons skilled in the art without departing from the spirit of the invention, the scope of which is defined by the appended claims.

What is claimed is:

1. A bifocal fitting device comprising a fitting lens having a plurality of imitation bifocal wafers of different types marked thereon and spaced along the circumference of the lens and an index associated with each wafer.

2. A bifocal fitting device comprising a fitting mounting, and a fitting lens mounted on the mounting having a plurality of imitation bifocal wafers of different types marked on the lens and spaced along the circumference of the lens, an index associated with each wafer, and an index on the mounting for cooperating with the wafer indices, the lens being rotatable relatively to the frame.

3. A bifocal fitting device comprising a fitting lens having a plurality of imitation bifocal wafers of different types marked thereon and spaced along the circumference of the lens and differently related to the center of the lens, the fitting lens having the same magnification both in the wafers and the adjacent portions of the lens.

4. A bifocal fitting device comprising a fitting mounting, and a fitting lens mounted on the mounting and having a plurality of imitation bifocal wafers of different types marked on the lens and spaced along the circumference of the lens and differently related to the center of the lens, the fitting lens having the same magnification both in the wafers and the adjacent portions of the lens.

In testimony whereof, I have hereunto subscribed my name.

GEORGE WILLIAM PERKINS,
*Administrator of the Estate of George M. Smith, Deceased.*